United States Patent [19]

Anders

[11] 4,050,836
[45] Sept. 27, 1977

[54] PORTABLE FIELD MACHINE FOR CUTTING, GRINDING AND LAPPING VALVE SEATS

[75] Inventor: Ronald J. Anders, Raleigh, N.C.

[73] Assignee: Rockwell International Corporation, Pittsburgh, Pa.

[21] Appl. No.: 701,958

[22] Filed: July 1, 1976

[51] Int. Cl.$^2$ .......................... B23B 3/26; B23B 41/00
[52] U.S. Cl. ........................................ 408/20; 408/80; 408/130; 82/1.4; 82/4 C; 90/12.5; 51/241 A; 29/560
[58] Field of Search .............................. 408/20, 79–83, 408/115, 125, 130, 702, 181, 185, 131; 82/4 C; 51/241 VS, 241 A; 90/12.5; 29/26 B, 560

[56] References Cited

U.S. PATENT DOCUMENTS

| 1,708,798 | 4/1929 | Nelson | 408/20 |
| 1,814,078 | 7/1931 | Cole et al. | 29/26 B |
| 2,180,289 | 11/1939 | Carlton et al. | 408/20 |

FOREIGN PATENT DOCUMENTS

| 2,215,683 | 10/1973 | Germany | 51/241 VS |
| 96,948 | 7/1897 | Germany | 90/12.5 |
| 1,357,108 | 6/1974 | United Kingdom | 82/4 C |

Primary Examiner—Leonidas Vlachos

[57] ABSTRACT

A portable field machine for cutting, grinding and lapping the valve seat of a valve body having a valve disc axially translatable in a cylindrical valve chamber with respect to the seat includes a pair of axially spaced spiders having radially extendable arms engageable with the walls of the cylindrical valve chamber on opposed sides of the valve seat, the spiders being interconnected by a rigid shaft which is thereby axially positioned with the chamber axis and a tool holder adapted to selectively hold either cutting, grinding or lapping tools is rotatably and reciprocably supported on the shaft for axial movement therealong and rotation thereabout with respect to the valve seat, the tool holder rotatably supporting a carrier which is fixed against relative rotation and which is connected to a drive means for operatively rotating the tool means and tool holder concentrically with respect to the axis and the valve seat to perform profile forming operations thereon, the tool holder including feed means for radially and axially translating the tool position to achieve the desired spacial relationships with the valve seat.

13 Claims, 13 Drawing Figures

PORTABLE FIELD MACHINE FOR CUTTING, GRINDING AND LAPPING VALVE SEATS

BACKGROUND OF THE INVENTION

The present invention relates to a machine for performing profiling operations on a valve body and, in particular, a portable machine for selectively performing cutting and grinding operations on a valve seat in the field without removal of the valve from the fluid line.

In field service, the sealing interface between the valving member and its associated valve seat can be damaged to an extent that the requisite sealing is impaired and repair thereof is necessary to establish acceptable valving operation for the particular fluid control application. Such damage may occur to either the valving member or the valve seat and can occur through corrosion, erosion, frictional wear, distortion, and structural damage due to the presence of foreign objects. Whereas the valving member may be removed for repair or replacement of its sealing surfaces, the valve body is typically welded integrally to the fluid line and, particularly in the case of a large valve, can not be practically removed for valve repair.

Various techniques have thus evolved for field repair of large valves. If the required repair to the sealing interface is minor, portable lapping rigs can be used for directly lapping the sealing interface between the valve member and the valve seat. However, if resurfacing of the valve seat is necessary or the damage to either the seat or the sealing member is excessive, lapping becomes impractical due to excessive time and wear to the parts. Where only the valve seat is impaired, lapping tools are available for the seat, but this approach is similarly restricted to minor repairs.

When extensive valve seat repair is required, the only commercially available machines have been extremely large and bulky rigs which are mounted exteriorly of the valve bonnet and have an extentable cantilevered shaft which is translatable toward the valve seat. The rig performs cutting and grinding operations on the seat. These machines, which typically weigh around two or three thousand pounds, are not entirely satisfactory for field use, particularly where only limited access and limited overhead space is available, such as in nuclear power plants. Moreover, the configuration of the rig's extended ram may permit eccentricity of the ram with respect to the valving axis during the profile forming operation. Thus, out-of-roundness and irregular surface finish can result.

SUMMARY OF THE INVENTION

The present invention provides a lightweight, compact field machine for repairing valve seats that is operable in limited access quarters. The machine is accurately mounted interior of the valve bonnet and includes a tool holder having a profiling head which selectively carries cutting, grinding or lapping tools and which is centrally rotatably supported on and translatable with respect to a rigid shaft. The head can be accurately, radially and axially fed into the desired operative relationship for performing the profiling operations on the valve seat.

More particularly, the machine includes upper and lower support spiders which are interconnected by a guide shaft. The spiders include radially extendable arms which engage bore surfaces in the valving chamber above and below the valve seat so as to coaxially position the shaft on the chamber axis. The tool holder is guidably supported on the shaft by a linear rotatable bearing for controlled axial and rotating movement thereabout. The tool holder is adapted to carry a single point cutting tool, an air powered grinding wheel or a lapping tool for performing its profiling operations on the valve seat. For the cutting and grinding operation, the tool holder is provided with a radial feed for positioning of the tool. A drive carrier assembly is rotatably supported on the tool holder, but is held against relative rotation by engagement with a fixed surface on one of the spiders. The carrier includes a drive shaft having a plurality of sprockets mounted thereon. A first chain connects one of the sprockets to associated sprocket fixed to the tool holder. A second chain connects the other sprocket with the drive sprocket on the air motor fixedly supported on the carrier. With the carrier thus held against rotation, energization of the drive motor translates rotary motion thereof through the drive shaft, the sprockets and the drive chains to orbit the tool holder and associated tool with respect to the valve seat to perform the desired profiling operations. Inasmuch as the drive motor is directly carried for concurrent axial movement with the tool holder the entire drive system may be supported internally of the valve body. A torque arm carried by another spider engages a flow rib in the outlet passage of the body to prevent rotation of the machine in the bore during the machining operations. In the above manner, an extremely compact, multipurpose profiling machine is provided for field service.

The above and other features will be apparent to those skilled in the art upon reading the following detailed description, reference being made to the accompanying drawings illustrating a perferred embodiment in which:

DESCRIPTION OF THE DRAWINGS

FIG. 4A is an enlarged cross-sectional view broken along the axis of the machine and showing the drive means thereof;

DESCRIPTION OF THE INVENTION

Figure 1:
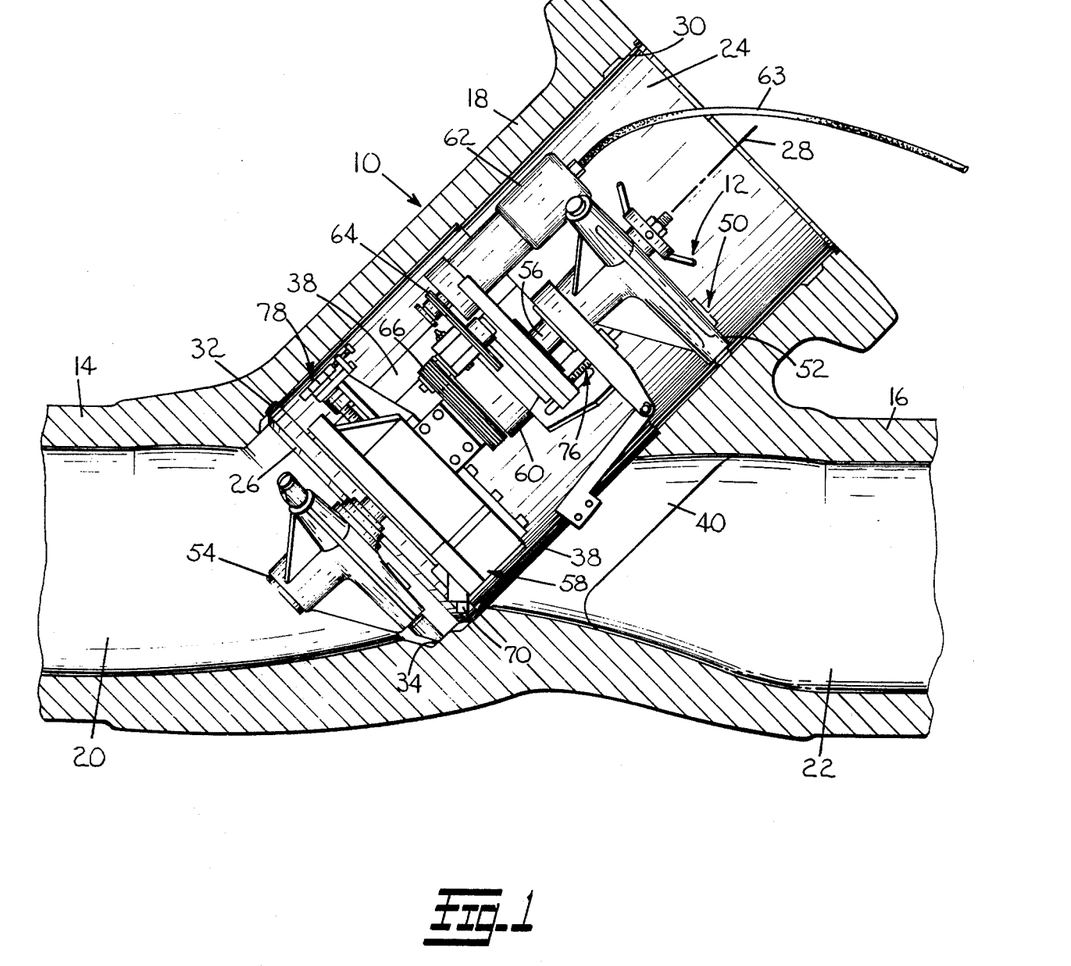
FIG. 1 is a side cross-sectional view of a portable field machine made in accordance with the present invention operatively disposed in the valve body and showing the tool holder in the cutting mode.

Referring to FIG. 1, there is shown a valve body 10 in which a portable field machine 12 made in accordance with the present invention is internally operatively disposed. More particularly, the valve body 10 includes coaxially disposed end sections 14 and 16 angularly intersected by a bonnet section 18. The sections 14, 16 and 18 respectively define an inlet flow passage 20, an outlet flow passage 22 and a control chamber 24.

In field installation, the end sections 14 and 16 are welded to a fluid flow line. A valve disk (not shown) is slidably disposed in the control chamber. The valve disk is connected to a stem and movable thereby between an open position, substantially non-restricting passage of fluid from the inlet 20 to the outlet 22, and a closed position wherein a frusto-conical seat of the disk sealingly engages a frusto-conical valve seat 26 formed coaxially with the axis 28 of the control chamber 24 at the exit of the inlet passage 20. The stem extends through a bonnet assembly bolted at the upper end of the control chamber 24. The stem is operatively connected to a suitable actuator for moving the valve disk between the open position and the closed position. One such typical valve is shown in U.S. Pat. No. 3,601,157 (Milleville et al.), issued on Aug. 24, 1971, and assigned to the Assignee of the present invention.

The control chamber 24 comprises an upper right circular cylindrical bore 30 terminating at its lower end with an annular relieved groove 32 which is intersected by the outer upper edge of the aforementioned frusto-conical valve seat 26 and by a lower right cylindrical bore 34 which intersects the inner lower edge periphery of the valve seat 26. The bores 30 and 34 define axially spaced annular surfaces coaxially disposed with respect to the axis 28 on opposite sides of the valve seat 26. Axially extending ribs 38 formed of stellite are inlaid on the bore surface 30 to provide hardened guide surfaces for the valve disc. Similarly, the material surrounding the valve seat 26 is formed from a hardened inlay material such as stellite. Additionally, a flow guide rib 40 is formed diametrically across the entrance of the outlet flow passage 22. The rib 40 is contoured to improve the flow characteristics of fluid passing through the control chamber 24 into the outlet passage 22.

The portable field machine 12 generally comprises a bore support assembly 50 including an upper spider 52, a lower spider 54, an interconnecting guide shaft 56, a tool holder 58 supported on the shaft 56 for axial and rotatable movement thereabout, a drive carrier assembly 60 rotatably supported on the tool holder 58 and locked against relative movement so as to be axially movable in unison with the tool holder 58, and a drive motor 62 including supply line 63 secured to the carrier 60 and operative to drive chain assemblies 64 and 66 to rotate the tool holder 58 with respect to the axis 28.

Figure 2:
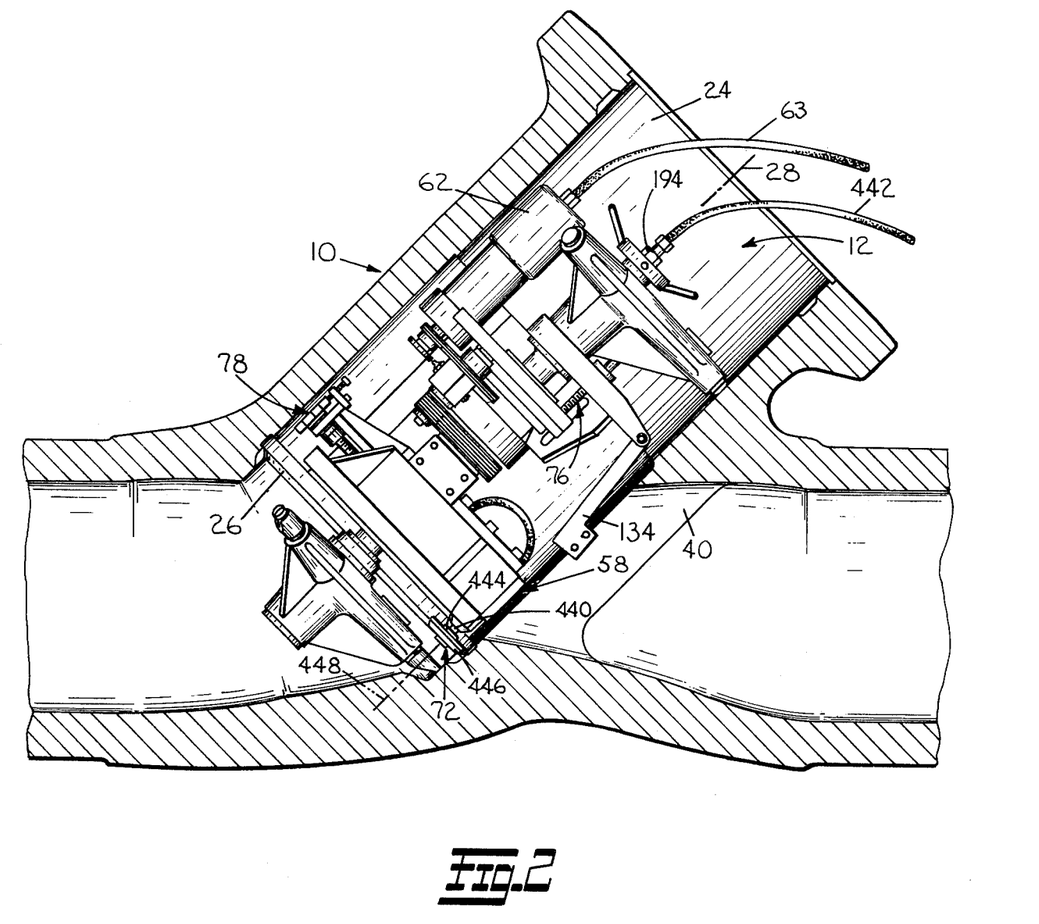
FIG. 2 is a view similar to FIG. 1 showing the portable field machine with the tool holder in the grinding mode.
Figure 3:
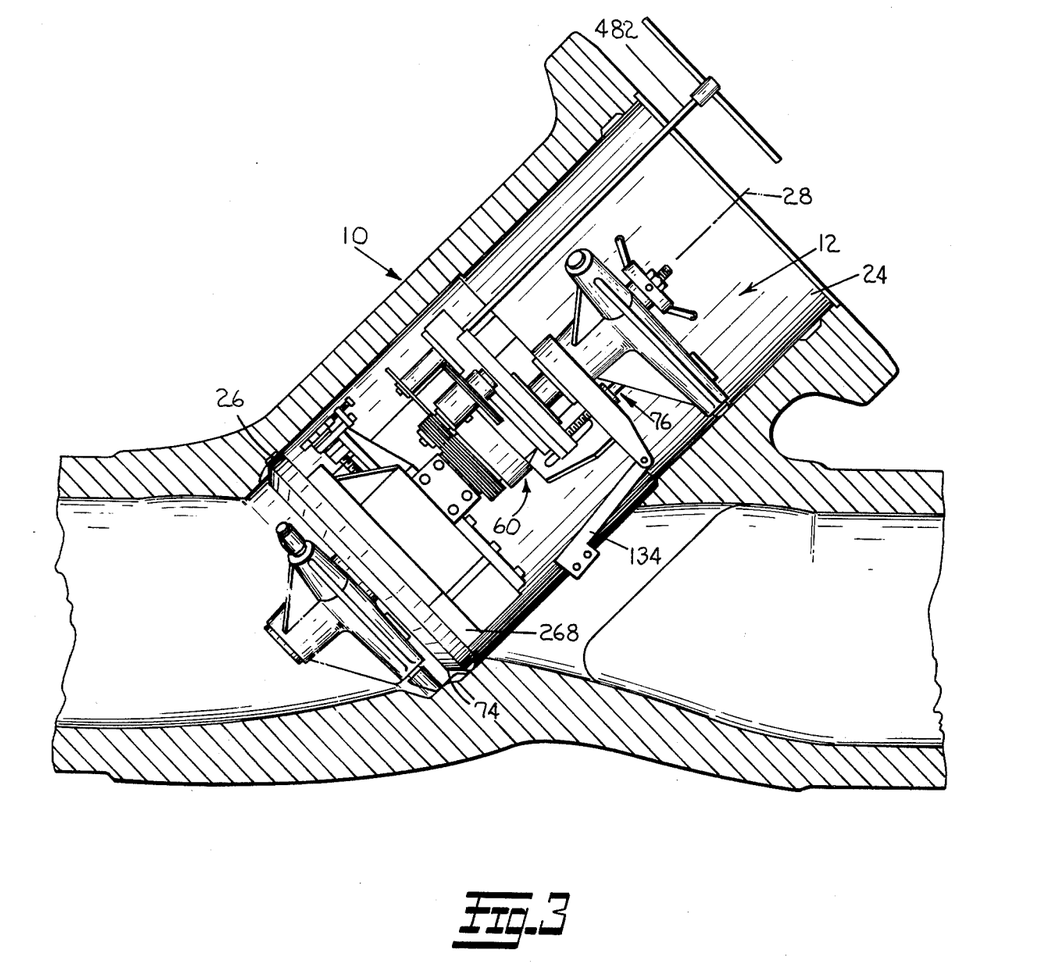
FIG. 3 is a view similar to FIG. 1 showing the portable field machine with the tool holder in the lapping mode.

The tool holder 58 is adapted to carry a plurality of valve seat profiling devices including a single point cutting tool assembly 70 as shown in FIG. 1, a grinding tool assembly 72 as shown in FIG. 2, or a lapping disk 74 as shown in FIG. 3. The cutting, grinding and lapping operations are performed selectively and successively to most efficiently establish the valve seat profile with the requisite surface finish. For only necessary minor repairs, only the lapping operation may be required. For slightly greater valve seat impairment, only grinding and lapping will be required. For major imperfections in the valve seat surface, all three operations would be successively performed as hereinafter described.

The individual profiling devices are axially positioned by means of an axial feed assembly 76 and radially positioned by means of a radial feed assembly 78.

The description will now proceed with reference to a field machine 12 incorporating the cutting device, the modifications necessary to incorporate the grinding and lapping devices being referenced and described in detail thereafter.

Figure 4B:
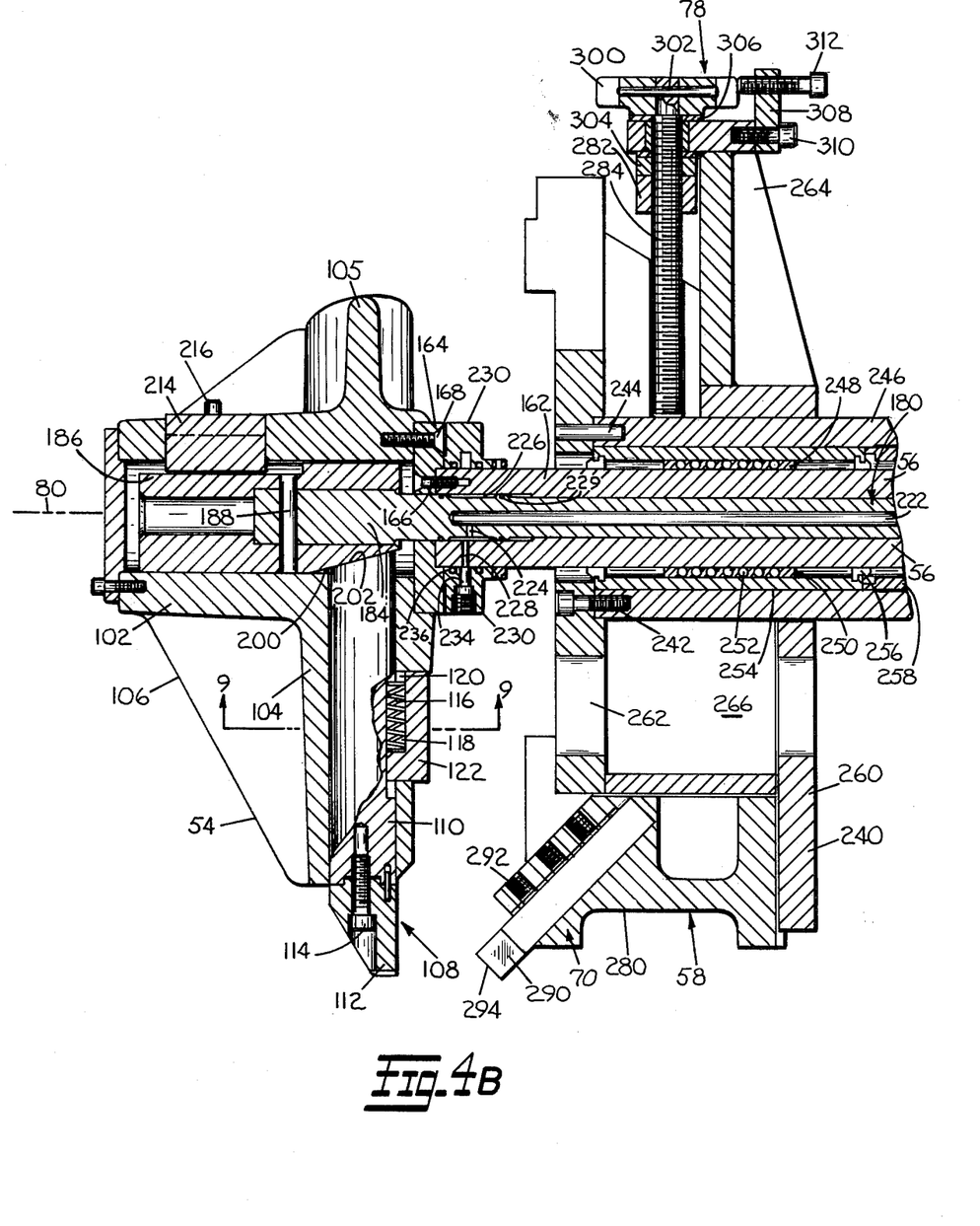
FIG. 4B is similarly an enlarged cross-sectional view broken along the axis of the machine and showing the tool holder of the machine.
Figure 5:
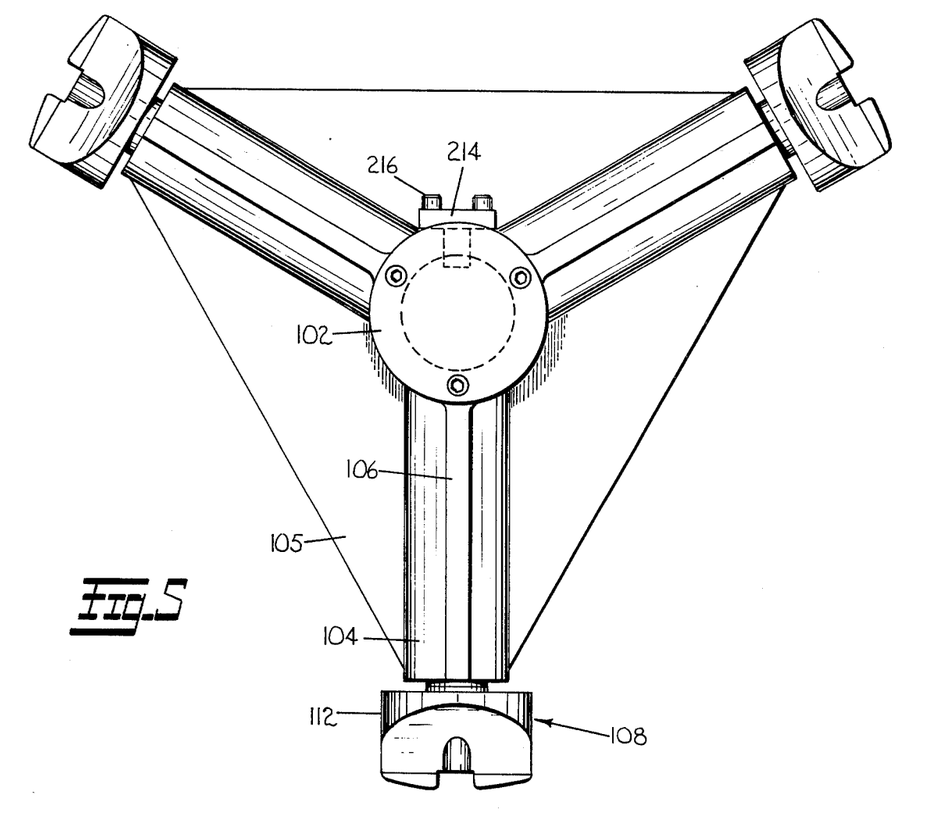
FIG. 5 is an end view of the machine showing only the lower spider and extendable arms thereof.

The support assembly 50 is self-centering with respect to the axis 28 of the control chamber 24 in that spiders 52 and 54, as shown in FIGS. 4A, 4B and 5, include radially extendable arms which engage the inner surfaces of the bores 30 and 34 to align the axis 80 of the machine 12 coaxially with the axis 28 of the control chamber 24. More particularly, the upper spider 52 includes a central hub 82 and three equally circumferentially spaced radially extending spokes 84 interconnected by webs 85 and supported by triangular ribs 86. Each spoke 84 carries an extendable arm assembly 88. The arm assembly 88 comprises a shaft 90 reciprocably supported in a bore in the spoke 84 having a pad 92 attached to the outer end thereof which engages the bore surface. A compression spring 94, retained in a key way 96 in the shaft 90 and a slot 98 in a plate 100 attached to the spoke 84, is operative to retract arm assembly 88 toward the axis 80.

Figure 9:
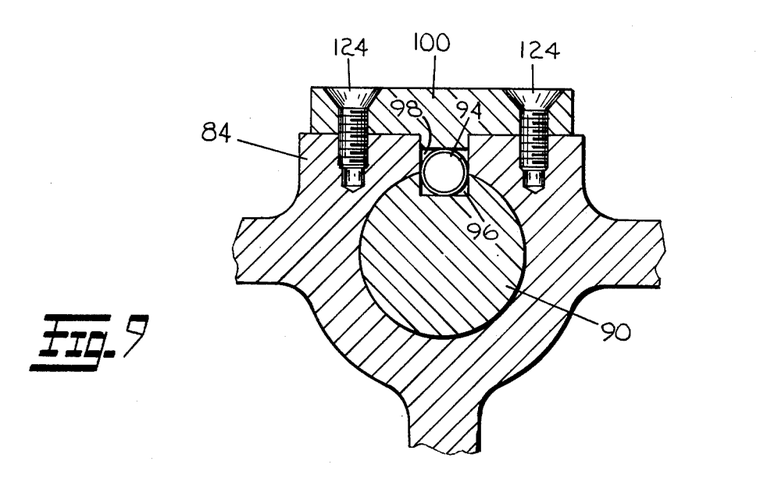
FIG. 9 is a view taken along line 9 — 9 of FIG. 4 showing the spring retraction means for the extendable arms.

Similarly, the lower spider 54 includes a hub 102 having three equally circumferentially spaced radially extending spokes 104 interconnected by webs 105 and supported by triangular ribs 106. Each spoke 104 carries an extendable arm assembly 108 including the shaft 110 slidably supported in a bore in the spoke 104 and having a pad 112 engageable with bore 34 and attached to the outer end of shaft 110 by means of a screw 114. A compression spring 116, retained between a key way 118 in the shaft 110 and a slot 120 in a plate 122 attached to the spoke 104 by screws 124 (FIG. 9), is operative to retract and bias the arm assembly 108 toward the axis 80.

Figure 7:
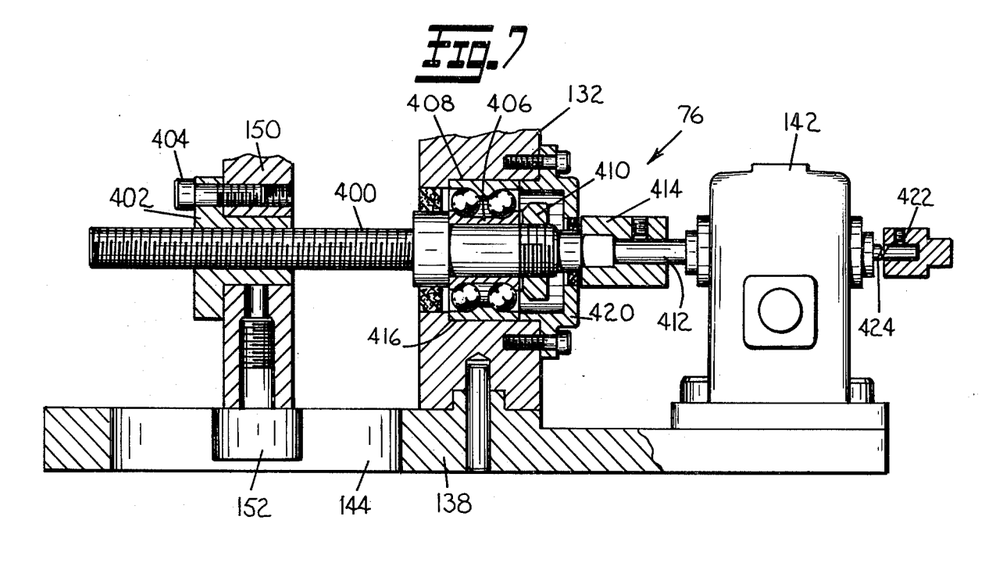
FIG. 7 is a view taken along line 7 — 7 of FIG. 6 showing details of the axial feed assembly.

An anti-rotation assembly 130 is operative to lock the machine 12 against rotation in the valve body and the carrier assembly 60 against rotation relative to the stationary support assembly 50. The assembly 130 includes a plate 132 located on the lower surface of the hub 82 to which anti-rotation arm 134 is connected at a pin connection 136. The arm 134 extends downwardly from pin connection 136 and is adapted to be pivoted outwardly into engagement with the rib 40 as illustrated in FIGS. 1 through 3. Thus any torque transmitted to the support assembly 50 during any of the profiling operations will be borne by the engagement between the arm 134 and the rib 40. The anti-rotation assembly 130 further includes a plate 138 attached to an angularly spaced section 140 of the plate 132 by fasteners 142. As shown in FIG. 7 the plate 138 includes a lower section having an elongated slot 144 formed therein. A gear reducer 146, part of the axial feed assembly 76 to be described in greater detail below, is retained at the upper end of the plate 138. An outwardly extending arm 150 of the carrier assembly 60 includes a guide pin 152 which is slidably retained in the slot 144. The carrier 60 and the tool holder 58 are axially movable as a unit between positions by the axial feed assembly 76. When the motor 62 is energized, inasmuch as the carrier assembly 60 is rotatably supported on the tool holder 58, rotation of the carrier assembly 60 is prevented by locking the guide pin 152 against rotation within the confines of the slot 144 of the fixed plate 138.

The shaft 56 includes an upper flanged end 154 which is received within a counter bore in the arm 134 of the anti-rotation assembly 130. The flange 154 and the plate 132 are attached and positioned on the lower end of the hub 82 by means of screws 156 and dowel pins 158. The shaft 56 has an axially extending through-hole 160. The shaft 56 has a substantially constant diameter section 162 depending downwardly from the flange 154. A circular collar 164 is located on and fixedly attached to the lower end of section 162 by means of screws 166. The collar 164 is fixedly attached to the upper end of the hub 102 of spider 54 by means of screws 168. In this manner, the upper spider 52 and the lower spider 54 are rigidly structurally interconnected by the shaft 56 and its associated parts.

A draw rod assembly 180 entends through the hole 160 in the shaft 56. The draw rod assembly 180 is operative to radially outwardly extend the shafts 90 and 110 of the upper spider 52 and the lower spider 54, respectively. More particularly, the assembly 180 includes a central rod 182 extendng through the hole 160 having its lower end 184 attached to an arm expander sleeve 186 by means of a cross pin 188 and its upper end 189 passing through an upper arm expander sleeve 190 slidably supported in a center bore in the hub 82. The rod 182 has a threaded outer end 192 to which a nut 194 is attached. The upper expander sleeve 190 includes a plurality of inclined surfaces 196 adapted to engage mating inclined surfaces 198 on the shaft 90. The lower expander sleeve 186 includes a plurality of inclined surfaces 200 adapted to engage mating inclined surfaces 202 on the shafts 110. The surfaces 196 and 200 are inclined in opposite directions with respect to the axis 80. Accordingly, upon tightening the nut, 194, the effective length of the draw rod assembly 180, as referenced to the upper and lower surfaces of the expander sleeves 190 and 186, is decreased thereby axially drawing the sleeves together and causing the surfaces 196 and 200 to outwardly cam the shafts 90 and 110 equally until the pads 112 and pads 92 engage the surfaces of the bores 30 and 34. The shafts 90 and 110 are forced outwardly against the biasing of the springs 94 and 116.

The expander sleeve 190 is locked against rotation in the hub 82 by means of a key 210 received in a slot in the former and connected thereto by screw 212. The expander sleeve 186 is locked against rotation on the hub 102 by means of the key 214 retained in a slot therein and locked thereto by means of screws 216. The upper end of the expander sleeve 190 is threaded and handwheel 220 is threaded thereon. In the event the shafts 90 bind and do not retract upon loosening of the nut 194, the handwheel 220 can be tightened to engage the top surface of the hub 82 thereby upwardly drawing the sleeve 190, increasing the overall length of the draw rod assembly 180, and establishing a clearance space between the camming surfaces. This allows the shafts to be biased inwardly by the springs 94, 116 to permit withdrawal of the machine 12 from the valve body 10.

The rod 182 includes an axial hole 222 extending from the upper end down to the vicinity of the collar 164. The axial hole 222 is radially intersected by a radial port 224. The port 224 further communicates with an annular relief 226 in the outer surface of the draw rod 182 and provides fluid communication with radial ports 228 in the lower end of the shaft 56. A pair of axially spaced O-rings seal the relief 226 between the draw rod 182 and the shaft 56. A cylindrical ring 230 is rotatably disposed between the collar 164 and a stop collar 232. The ring 230 includes radial passages 234. As hereinafter described, the passage 234 receives a fluid flow fitting for connecting an air line to the air grinder, FIG. 2. Similarly, the upper end of the draw rod 182 receives a fitting for connecting a source of air for driving the grinder. This provides a direct fluid flow passage and rotatable connection for delivering air from the air source to the air grinder. The ring 230 includes a pair of O-rings to provide a seal with the outer surface of the rod 182. The ring 230 is thus free to rotate with respect to rod 182 in accordance with movement of the tool holder 58 to provide a constant air distribution to the grinder.

Figure 6:
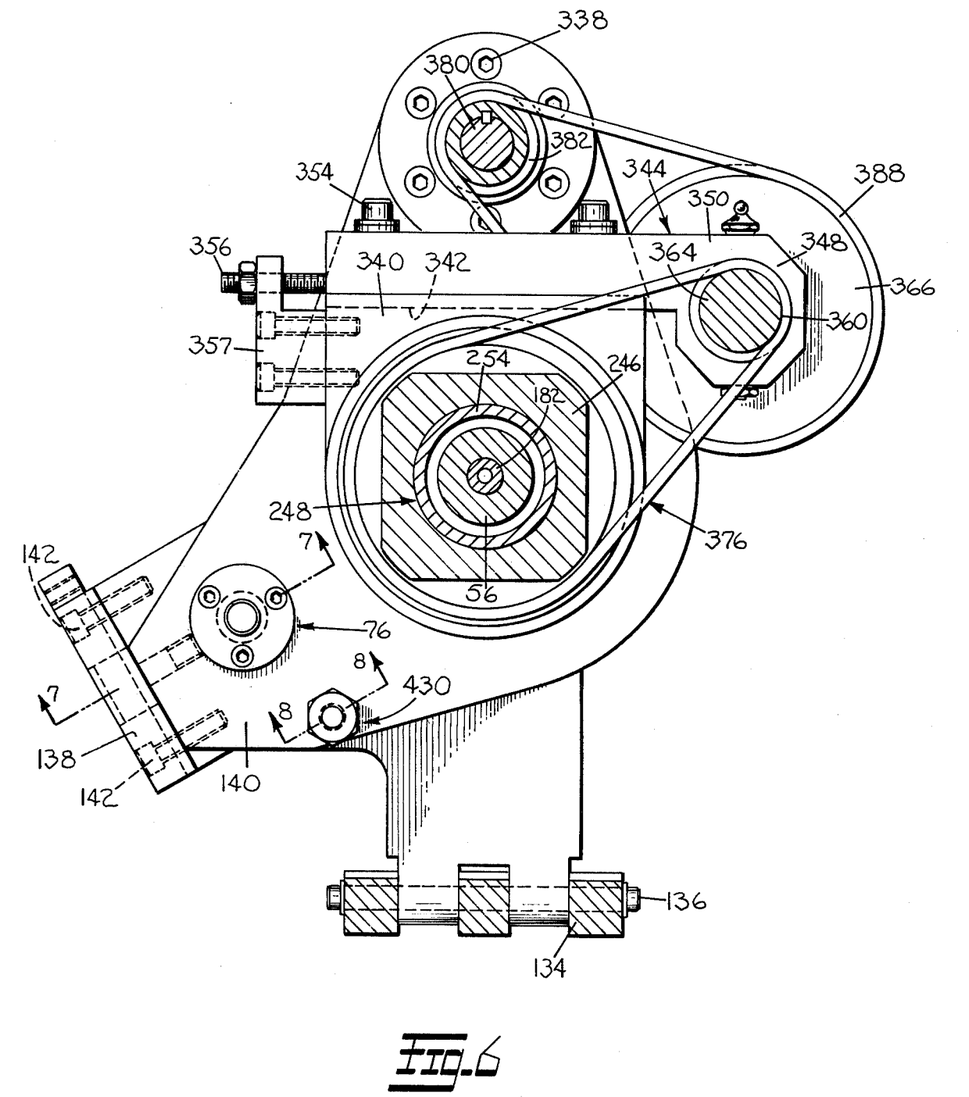
FIG. 6 is a view taken along line 6 — 6 in FIG. 4 showing the details of construction of the drive means, the carrier and the tool holder.

The tool holder assembly 58 includes a weldment 240 which is fixedly connected by screws 242 and dowel pins 244 to a flat sided support block 246 (FIG. 6), which encircles the shaft 56 and is supported for axial movement therealong and rotatable movement thereabout by a pair of axially spaced rotatable-translatable bearings 248 returned within a bore therein. Each bearing 248 comprises a cage 250 which retains a plurality of balls 252 with the inner surface of the bearing sleeve 254 forming the outer race and the outer surface of the draw rod 182 forming the inner race. The ends of the bearings 248 are sealed by dust seals 256. The bearings 248 are axially separated by a spacer sleeve 258. The bearings 248 permit guided relative rotation and axial movement between the tool holder assembly 58 and the shaft 56. The weldment 240 includes a base plate 260, a clamp down plate 262 in spaced relation to the plate 260, a feed screw support assembly 264 and associated side walls 266 and 268. The weldment 240 interiorly defines a space surrounding the block 246 in which the cutting tool assembly 70 is slidably retained for a radial movement with respect to the axis 80.

The tool assembly 70 includes a tool fixture 280 having a pair of spaced legs (not shown) extending cordally therefrom and interconnected by a crossbar 282 located on the other side of the axis 80 through which a feed screw 284 of the axial feed assembly 76 is threadably connected. As described below, rotation of the feed screw 284, which is axially fixed with respect to the support assembly 264 and rotatably supported thereon, serves to radially translate the crossbar 282 with respect to the axis 80 so as to radially shift the fixture 280 with respect to the weldment 240. The fixture 280 is retained on the weldment 240 by tightening screws (not shown) to thereby clamp the plate 262 thereagainst.

The tool assembly 70 carries a single point carbide tipped cutting tool 290 which is retained in an inclined slot in the fixture 280 and fixed therein by set screws 292. The tool 290 has a cutting edge 294 inclined to the axis 80 identically to angularity desired for the valve seat 26.

The radial feed assembly 78 includes the aforementioned feed screw 284 having a star wheel 300 attached at its outer end by tapered pin 302 and axially positioned with respect to the support assembly 264 by a collar 304 supported for rotation in bushings 306. The star wheel 300 has a plurality of circumferentially spaced grooves the sides of which are engaged by a suitable striking tool so as to limitedly rotate the star wheel 300 and the feed screw 284 to radially shift the cross bar 282 and position the cutting edge 294 of the tool 290. When the desired radial position has been achieved, a locking bar 308 connected to the support assembly 264 at a pin connection 310 is rotated until the set screw 312 retained at the end thereof is engageable with a surface of the star wheel 300. The set screw 312 is tightened to thereby lock the radial position of the cutting tool.

The carrier assembly 60 comprises a housing 320 rotatably supported at the upper end of the block 246 by a pair of axially spaced roller bearings 322 contained in counterbores at the opposite ends thereof. The ends of the housing 320 are covered by annular dust seals 324. The housing 320 is axially retained on the shaft by means of an annular retaining ring 326 secured to the end of block 246 by fasteners 328. A weldment 330 including an outer annular ring 332 is fixed to an end flange of the housing 320 by a plurality of screws 334. The weldment 330 includes a bracket 336 on which the air motor 62 is mounted by means of screws 338, FIG. 6. The weldment 330 also includes a mounting plate 340 having a planar surface 342 on which a jack shaft assembly 344 is slidably retained.

Figure 10:
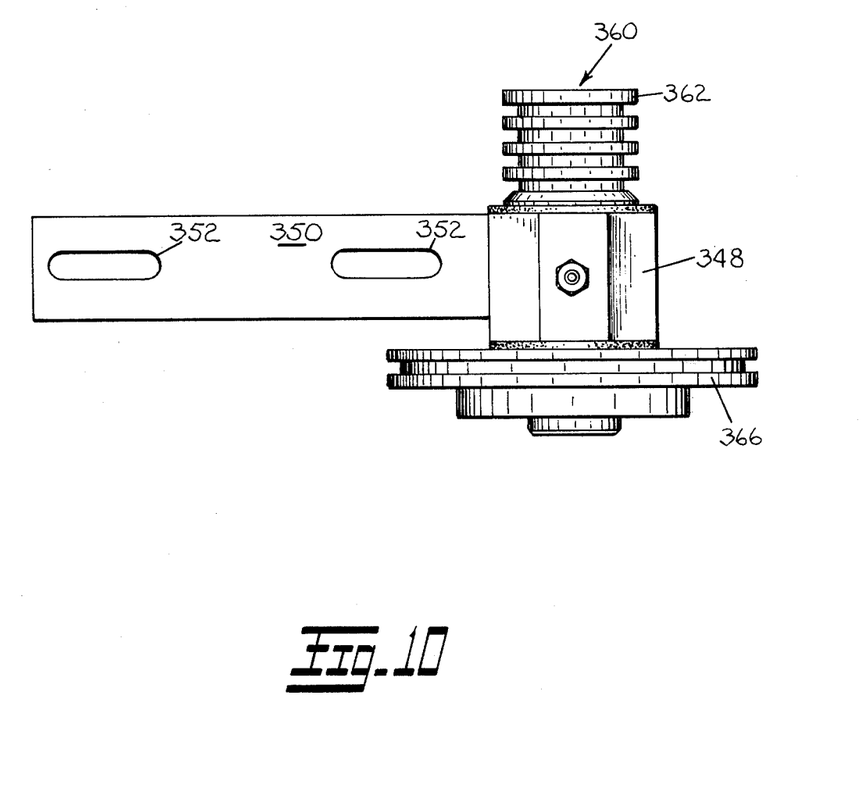
FIG. 10 is a fragmentary view of the jack shaft assembly.

As shown in FIG. 10, the jack shaft assembly 344 comprises a hub 348 to which an arm 350 is attached. The arm 350 includes a pair of spaced slots 352 through which screws 354 extend into tapped holes in the plate 340. The arm 350 and hub 348 are thus slidably retained for movement within the confines of the slots 352. An adjusting screw 356 retained on a bracket 357 mounted on plate 340 is adjustable to shift the jack assembly 344 to provide a chain adjusting capability as hereinafter described. A jack shaft 360 having a drive sprocket 362 at one end includes a shaft 364 which extends through a bore in the hub 348 and has a driven sprocket 366 attached to its upper end at a bushing 368 and key connection 370. The jack shaft 360 is thus rotatably retained on the hub 348 for rotation about an axis 372.

A driven sprocket 373 is received over the upper end of the block 246 and retained thereon by keys 374 axially below the carrier assembly 60. The driven sprocket 373 is aligned with the sprocket 366 and interconnected therewith by four drive chains collectively indicated at numeral 376. By sliding the jack shaft assembly 360 by means of adjusting screw 356, the slack in both drive chains can be removed cojointly.

The air motor 62 has an outlet shaft 380 on which a drive sprocket 382 is retained. The drive sprocket 382 is aligned axially with the drive sprocket 366. The sprockets 382 and 366 are drivingly interconnected by a double drive chain 388.

Accordingly, energization of the drive motor 62 rotates the sprocket 382 imparting relative rotation to sprocket 366, rotating the jack shaft 360 about axis 372 to correspondingly rotate sprocket 362 and thus sprocket 373 through chain 376. Inasmuch as the carrier assembly is precluded from relative rotation by arm 150 and guide pin 152 engaging plate 138, the block 246 rotates as accommodated by bearings 248 with carrier assembly 60 remaining stationary. This causes the tool assembly 58 to rotate about the axis 80 and the cutting tool 290 to orbit a path concentric with the axis 80.

The tool 290 is discretely radially and axially positioned by the radial feed assembly 78 described above and the axial feed assembly 76 shown in FIG. 7. The axial feed assembly 76 includes a feed shaft 400 having a threaded end received in a threaded nut 402 retained on arm 150 by fasteners 404. The other end of the feed shaft 400 extends through the inner races 406 of a pair of roller bearings 408 and is retained thereon by nut 410. The other end of the shaft 400 is operatively connected to the output shaft 412 of the gear reducer 146 by a coupling 414. The outer races 416 of the bearings 408 are fixedly retained on arm 132 by retaining cap 420. A feed nut 422 is attached to the output shaft 424 of the gear reducer 146. Manual rotation of the feed nut 422 through a suitable tool axially translates the arm 150 and thus the carrier assembly 60, the drive motor 62 and the tool assembly 58 as a unit axially along the shaft 56 until the desired axial position of the tool 290 is achieved.

The tool 290 is then radially positioned by operation of the radial feed assembly 78. The cutting operation is then initiated.

When the cutting operation has been completed, the locking mechanism 308 is unlatched and the star wheel 300 rotated to radially inwardly retract the tool 70 until it is interior of the bore 30. The axial feed assembly 76 may also be used to axially retract the cutting tool from the plane of the valve seat 26. The arm 134 is then pivoted inwardly of the bore 30. The nut 194 is loosened and the biasing of the springs 94 and 116 radially inwardly retract the arms. In the event the arms do not retract by mere loosening of the nut 194, the handwheel 220 is rotated to lift and break free the sleeves 190 and 186. Suitable lifting means, preferably positioned at the balance point of the machine, are used to retract the machine 12 from the valve body 10.

When removed from the valve body 10, the machine 12 may then be prepared for the grinding mode by loosening the plate 262 on the tool holder, unbolting the crossbar 282 and removing the entire tool 70 from the weldment 240. The grinding tool 72, substantially identical to the cutting tool 70 with the exception of an air-powered grinder, is substituted for the cutting tip. More particularly, the grinding tool 72 includes a weldment similar to weldment 240 to which an air motor 440 is attached. The air motor 440 is powered by air line 442 which connects with a fitting on the rotating ring 230 and in return receives air through passages in the draw rod 182 and from exterior air line 442. The air motor 440 has an output shaft 444 to which a grinding wheel 446 is attached. The grinding wheel 458 has an axis 448 parallel to the axis of the machine 12 and has a profile identical to that of the cutting tool and the desired profile for the seat 26. The plate 262 is then clamped to the weldment to fixedly capture grinding tool 72. The machine 12 is then lowered into the control chamber until the lower spider 54 is axially positioned adjacent lower bore 34 and the upper spider 52 is axially positioned in the bore 30.

The adjusting nut 194 is tightened, decreasing the effective length between the sleeves 190 and 186, thereby outwardly biasing the extendable arms 90 and 110 to fixedly position the machine in the control chamber with the axis 80 of the machine 12 coaxial with the control axis 28. Next, the torque arm 134 is outwardly pivoted to engage the guide rib 40 to circumferentially lock the machine in position. The grinding wheel 458 is axially and radially located to an operative cutting position by the feed assemblies 76 and 78 during which time the grinding motor is energized and the air motor 62 energized to begin orbiting of the grinding wheel 458 with respect to the seat 26 to perform grinding operation thereon. The requisite grinding is then accomplished by continued manipulation of the feed assemblies 76 and 78.

When desired surface finish and profile is achieved in the grinding operation, the grinding wheel 458 is radially retracted by the feed assembly 78 and the machine 12 is withdrawn from the valve body 10 as described above with reference to the cutting operation.

The machine is prepared for the lapping operation by removing the grinding tool 72 from the cross bar 282 and attaching the lapping disk 74 to the base plate 260 of the weldment 240 by means of circumferentially spaced bolts (not shown). The lapping disk 74 has a profile corresponding to the profile generated by the cutting tool and the grinding wheel. In the event it is desired to rotate the lapping wheel by means of the air motor, the machine is positioned in the bore as described above until the lapping desk engages the valve seat 26.

Figure 8:
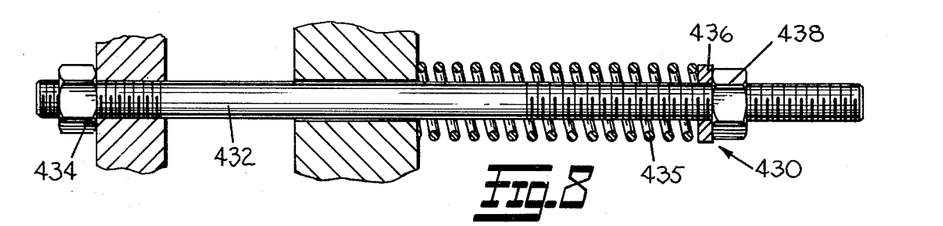
FIG. 8 is a view taken along line 8 — 8 of FIG. 6 showing lapping tool balancing assembly.

In order to limit the engagement pressure between the lapping wheel 74 and the valve seat 26, a lapping tool balancing assembly 430, as shown in FIG. 8, is provided. The balancing assembly 430 includes draw bolt 432 having threaded ends thereon. As additionally shown in FIG. 6, the bolt is adapted to be positioned parallel with the axis 80 of the machine and extend through holes in arm 150 and the arm 132. A nut 434 is provided on the end adjacent the arm 150. A helically coiled compression spring 435 is compressively retained between the top surface of the plate 132 and a washer 436 axially adjustably positioned by a nut 438. With proper adjustment of the nut 438, a variable upward biasing force can be exerted on the arm 150 so as to lift the entire tool assembly 58 until the desired surface to surface loading is achieved between the lapping wheel 74 and the valve seat 26. The motor 62 is then energized, an appropriate lapping abrasive being supplied at the interface, until the desired surface to surface contact is achieved at which time the machine is withdrawn in the previously described manner.

Figure 11:
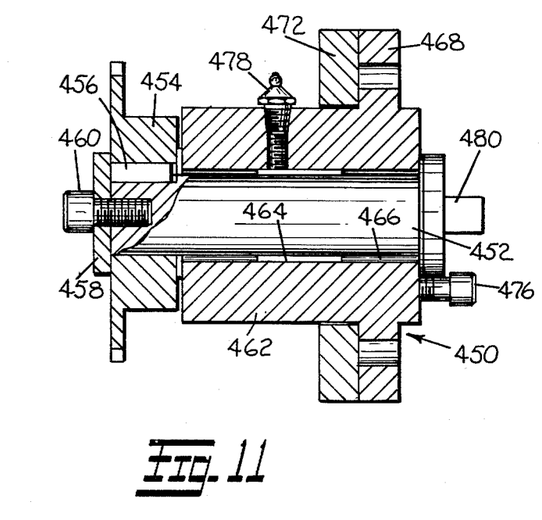
FIG. 11 is a cross-sectional view of the adapter assembly for hand lapping.

In the event manual lapping of the surfaces is desired, the air motor 62 is removed from the bracket 336 by removing the chain from the sprocket 382 and removing the screws 338. A manual feed adapter assembly 450 as shown in FIG. 11 is then attached thereto.

Figure 12:
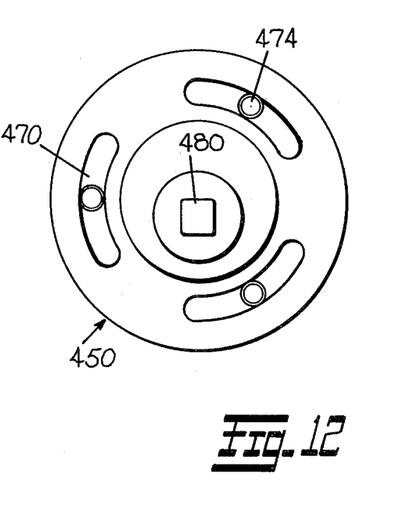
FIG. 12 is an end view of FIG. 11 showing the mounting arrangement for the adapter assembly.

The adapter assembly 450 comprises a flanged shaft 452 having a sprocket 454 circumferentially retained thereon by a key 456 and axially captured thereon by a washer 458 and screw 460. The shaft 452 extends through a housing 462 having an eccentrically disposed bore 464. The shaft 452 is rotatably supported in the bore 464 on bushings 466. The housing 462 includes a peripheral end flange 468 having three arcuate elongated slots 470 formed therein. An annular retaining plate 472 disposed over the housing 462 and engages the flange 468. The plate 472 includes three equally spaced tapped holes 474 on the same diameter as the slots 470 and the holes for the screws 338 (FIG. 4). The tapped holes 474 receive screws 476. The space between the bushings is provided with lubricant through a grease fitting 478. Referring jointly to FIGS. 3 and 12, the upper end of the shaft 452 is provided with a square head 480 for engagement by hand operated tool 482. The assembly 450 is assembled onto bracket 336 by inserting the screws vertically through the holes for the bolts 338 and the tapped holes 474. A single drive chain is then operatively connected between one set of teeth of the sprocket 362 and the teeth on the sprocket 454. The housing 462 is then relatively rotated and, due to the eccentric bore, any slack in the chain is taken up at which time screws 476 are tightened to lock the assembly in place on the bracket 336.

The machine 12 is then operatively disposed in the control chamber in the manner previously described for the lapping tool, the assembly 430 is adjusted to achieve the desired seating engagement, a lapping compound is provided at the interface, and by means of the hand tool 482 the lapping wheel 74 is rotated or oscillated until the desired lapping has been achieved. The machine is then withdrawn from the bore.

In view of the foregoing, it will thus be appreciated that the present machine provides an extremely compact multipurpose tool wherein cutting, grinding and lapping can be selectively used to provide an affirmative, coaxial seat resurfacing totally within the confines of the valve body bore. While intended primarily for field applications, it will also be appreciated that once the bores 30 and 34 are established at the factory the same machine may also be used for initially profiling the seating surface to achieve the desired profile and surface finish characteristics without requiring the use of conventional large machines. This represents a time savings in the more expensive machine while still providing the quality characteristics provided thereby.

While this invention has been shown and described with reference to the above embodiment, other forms will be readily apparent to those skilled in the art and, therefore, the description is not intended to limit the scope of the invention by the embodiment selected, but only by the claims which follow.

What is claimed is:

1. A body mounted valve seat finishing machine operatively disposed substantially totally internally of the cylindrical valving chamber of a valve body, said valving chamber having axially spaced surfaces coaxially disposed with respect to a control axis, said surfaces being on opposite sides of an annular valve seat having a profile adapted for sealing engagement by a valving member which is translatable along the control axis between a valve closed position engaging the seat and an open position spaced from the seat, said body mounted valve seat finishing machine comprising:

a stationary housing having axially spaced sections interconnected by a shaft member; means carried by the housing engageable with said surfaces for coaxially positioning the shaft with respect to the control axis; tool holder means including valve seat profile forming means; means rotatably and reciprocably supporting the tool holder means on the shaft member for axial movement along the control axis and rotation thereabout; carrier means rotatably supported on the tool holder support means; means preventing relative rotation between the carrier means and the housing; drive means operatively connected between the tool holder support means and the carrier means for rotating the tool holder means about the shaft member; first feed means operatively connected between the housing and the tool holder means for axially moving the latter, the carrier means and the drive means as a unit along the shaft; and second feed means for moving said profile forming means radially with respect to the tool holder means and shaft member whereby the profile forming means can be positioned axially and radially with respect to the axis for performing finishing operations on the valve seat.

2. A portable machine for field use in refinishing the valve seat of a valve body having a pair of flow passages axially intersecting a cylindrical control chamber having a control axis with the valve seat being frusto-conical and axially positioned intermediate to the passages, the control chamber having coaxially disposed cylindrical surfaces on either side of said valve seat, said machine comprising:

a support assembly having an upper section and a lower section axially spaced and rigidly interconnected by a support shaft; a plurality of radially extendable arms on each of said section; means operatively connected between the sections for cojointly equally radially extending said arms so as to engage said cylindrical surfaces and coaxially position said shaft on said control axis; a first bearing member operatively associated with the shaft for translation of an outer race thereof axially along the shaft and rotation thereabout; a tool holder support member fixedly connected to the outer race of the first bearing member so as to be translatable and rotatable cojointly therewith, said tool holder support member carrying a finishing tool selectively comprising a cutting tool assembly or grinding tool assembly for radial movement with respect to the control axis; a radial feed assembly operatively connected between the tool holder support member and the finishing tool for radially positioning the associated tool assembly with respect to the control axis; a second bearing member on said support member having an outer race relatively rotatable with respect to the first bearing member and the control axis; a carrier assembly fixed to the outer race of the second bearing member so as to be relatively rotatable with respect to the tool holder support member, the first bearing member and the control axis and axially translatable cojointly with the tool holder support member; a first driven member fixedly connected to the support member; a shaft assembly rotatably supported by and extending through the carrier assembly, said shaft assembly having a drive member drivingly connected to the first driven member and a second driven member connected to axially spaced portion thereof; a drive motor fixedly supported on the carrier assembly and having a driver member drivingly connected to the second driven member whereby the members form a drive train between said drive motor and the tool holder member; anti-torque means fixedly angularly positioning the carrier assembly with respect to the support assembly while accommodating axial movement thereof along said control axis whereby upon energization of the drive motor the drive train rotates the tool holder support member with the carrier assembly being locked against rotation relative to the support assembly thereby rotating the tool holder support member and the refinishing tool about the second bearing member coaxially with the control axis; and axial feed assembly for axially translating said tool holder support member relative to said housing so as to accurately axially position the associated finishing tool with respect to the control axis whereby selective positioning of the radial and axial feed assemblies can be used to position the finishing tool with respect to the valve seat to perform the desired finishing operations thereon.

3. The machine as recited in claim 2 wherein a lapping disc having a profile corresponding to the desired profile of the valve seat is secured to the tool holder member for lapping the valve seat.

4. The machine as recited in claim 3 wherein the drive motor is replaceable with a manually operated drive shaft for manual oscillation of the lapping disc, and spring biasing means are provided for counter balancing the weight of the tool holder member and lapping disc to limit the engagement force at the valve seat.

5. The machine recited in claim 2 wherein a pivotable arm carried by the support assembly is engageable within one of the passages to resist rotation of the machine within the chamber during profiling operation.

6. The machine recited in claim 2 wherein the grinding tool assembly includes a grinding wheel attached to an air motor connected to an air supply system including an air line fluidly connected between the motor and a rotatable collar on the shaft that communicates with an air passage extending through the shaft and connecting an exterior air source.

7. The machine recited in claim 2 wherein an axially positionable drawrod extends through a central passage in the shaft and upon axial movement thereof in one direction causes interengaging camming surfaces to outwardly displace the extendable arms into engagement with the cylindrical surfaces.

8. The machine recited in claim 7 wherein the camming surfaces are formed on the inner end of the arms and on sleeves slidably supported in coaxial bores in the upper section and the lower section and connected to the drawrod whereby axial movement of the rod shifts the sleeves to radially extend the arms.

9. The machine recited in claim 8 wherein spring means between the arms and the sections retract the arms when the drawrod is moved in the other direction.

10. The machine recited in claim 8 wherein means are provided for affirmatively shifting the sleeves in said other direction to provide clearance between the camming surfaces such that the spring means can retract the arms in the event the sleeves bind in the bores.

11. The machine recited in claim 2 wherein the driver and driven members are sprockets drivingly connected by a drive chain.

12. The machine recited in claim 11 wherein adjusting means are provided for shifting the position of the shaft assembly relative to the first driven member and second driver member to cojointly tighten the drive chains.

13. A valve body mounted machine for cutting, grinding and lapping the valve seat of a valve body, said valve body having pair of flow passages axially intersecting a cylindrical control chamber having a control axis, the valve seat being frusto-conical, coaxial with the control axis and axially intermediate the passages, the control chamber further having coaxially disposed cylindrical surfaces on either side of said valve seat, said machine comprising:

an upper spider and a lower spider; a hollow shaft rigidly connected to the spiders; extendable arms slidably received in radial bores in each of said spiders, said arms having camming surfaces formed on the inner ends thereof; a drawrod extending through a central passage in the hollow shaft; a sleeve slidably supported in coaxial bores in the upper spider and the lower spider and connected to the ends of the drawrod; radial camming surfaces formed on the sleeves whereby axial movement of the rod shifts the sleeves to interengage the camming surfaces thereby cojointly equally radially extending said arms so as to engage said cylindrical surfaces and coaxially position said shaft on said control axis; spring means between the arms and the spiders for retracting the extendable arm when the drawrod is moved in the other direction; means for affirmatively shifting the sleeves in said other direction to provide clearance between the camming surfaces such that the spring means can retract the arms in the event the sleeves bind in the bores; a first bearing member having a plurality of ball elements disposed between the shaft and an outer race thereof for accommodating axial movement and rotation of the outer race about the shaft; a tool holder support member fixedly connected to the outer race of the first bearing member so as to be translatable and rotatable cojointly therewith, said tool holder support member selectively carrying a valve seat profiling tool comprising a cutting tool assembly, a grinding tool assembly or a lapping tool for rotation about the control axis; a radial feed assembly operatively connected between the tool holder support member and the selected cutting tool assembly or grinding tool assembly for radially positioning the such associated tool assembly with respect to the control axis, said grinding tool assembly including a grinding wheel attached to an air motor connected to an air supply system including an air line fluidly connected between the motor and a rotatably collar carried on the shart and communicating with an air passage extending through the draw rod and connected to an exterior air source; a rotatable bearing on said tool support member having an outer race relatively rotatable with respect to the first bearing member and the control axis; a carrier assembly fixed to the outer race of the second bearing member so as to be relatively rotatable with respect to the tool holder support member, the first bearing member and the control axis and axially translatable cojointly with the tool holder support member; a first toothed sprocket fixedly connected to the support member; a jack-shaft assembly rotatably carrying a shaft said shaft having a second toothed sprocket drivingly connected the first toothed sprocket by a first drive chain and having third toothed sprocket connected to the other end thereof; a drive motor fixedly supported on the carrier assembly and having a fourth toothed sprocket drivingly connected to the third toothed sprocket by a second drive chain whereby the members form a drive train between said drive motor and the tool holder member; adjusting means for shifting the position of the shaft assembly and shaft relative to the first sprocket and the fourth sprocket to cojointly tighten the drive chains; antitorque means fixedly angularly positioning the carrier assembly with respect to the spiders while accommodating axial movement thereof along said control axis whereby upon energization of the drive motor rotates the tool holder member with the carrier assembly being locked against rotation relative to the support assembly; a pivotable arm carried by the support housing engageable within one of the passages to resist rotation of the machine within the chamber during profiling operation, the drive motor being replacable with a manually operated drive shaft for manual oscillation of the lapping disc; spring biasing means for counterbalancing the weight of the tool holder member and lapping disc to limit the engagement force at the valve seat; and axial feed assembly for axially translating said tool holder support member relative to said housing so as to accurately axially position the associated tool with respect to the control axis whereby selective positioning of the radial and axial feed assemblies can be used to position the finishing tool with respect to the valve seat to perform the desired finishing operations thereon.

* * * * *

UNITED STATES PATENT AND TRADEMARK OFFICE
CERTIFICATE OF CORRECTION

PATENT NO. : 4,050,836
DATED : September 27, 1977
INVENTOR(S) : Ronald J. Anders It is certified that error appears in the above-identified patent and that said Letters Patent are hereby corrected as shown below:

Column 13, Line 28, after "the" delete "shart" and substitute --shaft--.

Signed and Sealed this

Fourteenth Day of March 1978

[SEAL]

Attest:

RUTH C. MASON
Attesting Officer

LUTRELLE F. PARKER
Acting Commissioner of Patents and Trademarks